UNITED STATES PATENT OFFICE.

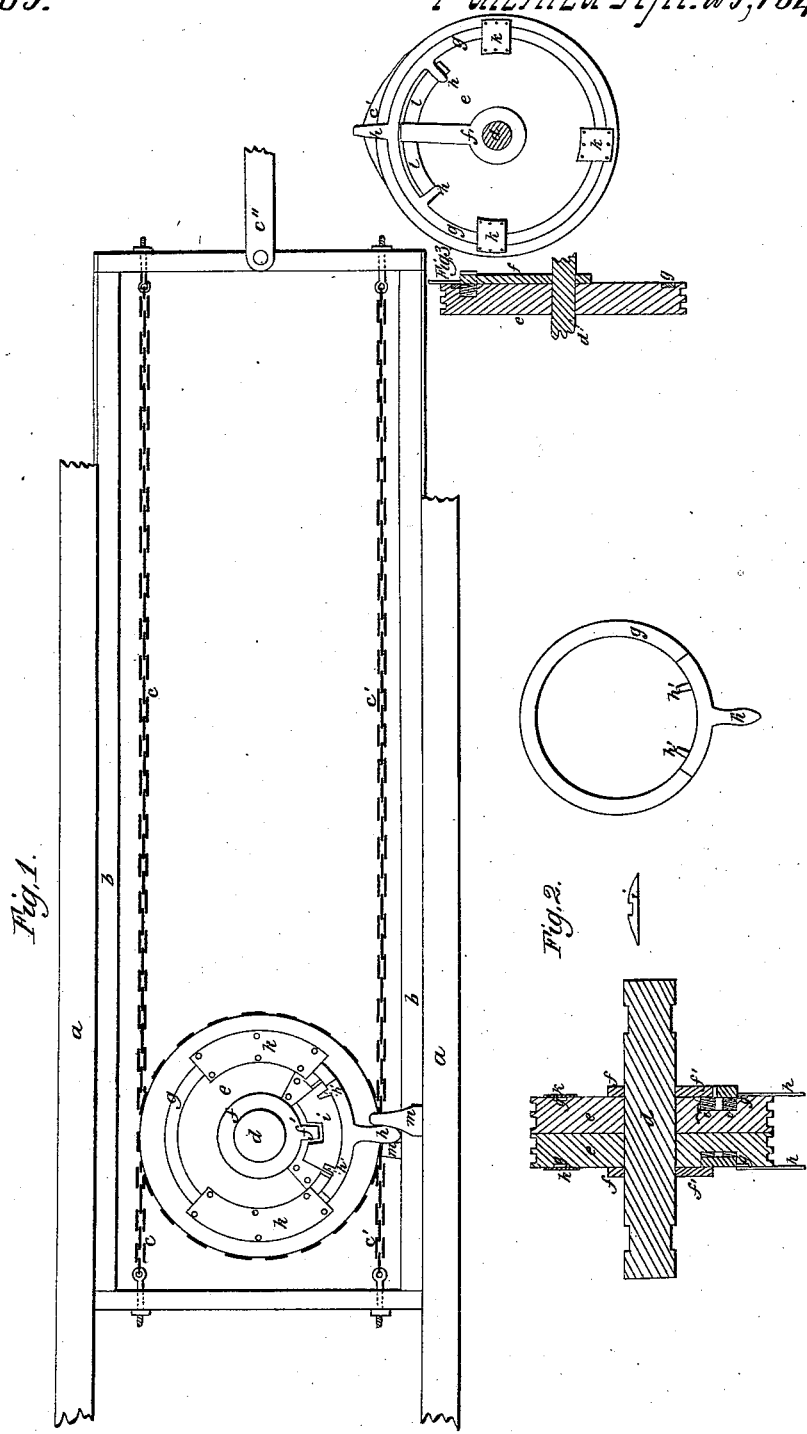

PETER YATES, OF MILWAUKEE, WISCONSIN TERRITORY.

MODE OF COUPLING AND UNCOUPLING PULLEYS WITH THEIR SHAFTS.

Specification of Letters Patent No. 3,063, dated April 25, 1843.

*To all whom it may concern:*

Be it known that I, PETER YATES, of the town and county of Milwaukee, in the Territory of Wisconsin, have invented a new and useful Improvement for Changing Reciprocating into Rotary Motion; and I do hereby declare that the following is a full, clear, and exact description thereof, reference being had to the accompanying drawing, making a part of this specification, in which Figure 1 is a side elevation; Fig. 2, detached parts; Fig. 3, modification of parts.

The nature of my invention consists in an apparatus, which connects the piston-rod of a steam engine with a revolving shaft, so as to convert a rectilinear, into a rotary motion, without the agency of a crank.

The construction of this machine is as follows, viz: A gallows-frame ($a$) is made of suitable dimensions, to receive a sliding gate ($b$); this gate is composed of two side pieces, connected by two cross heads ($b'$) at each end; the side pieces have a tongue or rib running their whole length, which slide in grooves in the gallows-frame. To each of the cross heads there are two chains ($c$ and $c'$) attached, for a purpose hereafter described, and to one of the cross heads the piston rod ($c''$) is affixed; this rod is connected with a piston of any common steam engine (not shown in the drawing).

At right angles to the plane of the sliding gate ($b$) and between the sides of the same, there is a shaft ($d$), on which two pulleys ($e$) are put, in the same plane as the gate; these revolve independent of the shaft, when not connected with it by a clutch: The two chains ($c$) pass around one of these pulleys on one side from opposite directions and after making one turn around it are connected with it; the other ends being attached, one to each cross head the other chains ($c'$) pass around the other pulley in a similar manner, but on the opposite side, by this arrangement it will be obvious that when the gate moves back and forth, the pulleys will turn in opposite directions to each other, and will alternate, so that one or the other will be moving in the direction the shaft is to be made to turn.

In the pulleys ($e$) on their outer face, a groove is cut all around near the periphery; in which a ring ($g$) is inserted; from this ring an arm ($h$) radiates out beyond the pulley, and on each side of this arm, are two others ($h'$) on the inner edge of the ring and projecting inward toward the center; there is a segment formed recess in the pulley extending around from under one arm ($h'$) to the other; in this recess a catch-piece ($i$) fits, in the center of the length of which, there is a notch to receive the end of an arm ($f'$) which extends out from the shaft beside the pulley; the catch piece ($i$) is chamfered off on each side of the notch toward the ends; (this is shown in Fig. 2, $i,$); in the recess under the catch there are spiral springs ($i'$) which push it forward; and when either of the arms ($h'$) on the ring ($g$) are brought over the catch, it forces it back so as to detach it from the arm ($f'$) on the shaft; the ring ($g$) is kept in place while it is allowed to turn by the plates ($k$) which are screwed onto the side of the pulley over the ring.

Another method for connecting the pulley with the shaft is, instead of having the catch piece ($i$) as above described; to have two short pawls ($l$ Fig. 3,) fitting into the recess; the ends nearest the arms ($h'$) being jointed in the recess, so as to allow the other ends to move out or in at pleasure; under the inner ends there are spiral springs which serve to project them outward; these pawls are far enough apart to receive the end of the arm ($f'$) between them; they are forced back into the recess in the same way that the catch piece is, by one of the arms ($h'$) passing over it. To bring up the piston at the end of the stroke gradually the side of the pulleys on the periphery is gradually swelled out eccentrically at the point ($e'$), where the chains are attached to it.

When this apparatus is put in operation, one of the arm ($f'$) is in connection with the pulley on that side, and the shaft revolves with it; after performing one revolution, the arm ($h$) strikes a projection ($m$) on the frame, and turns the ring ($g$) till the arm ($h'$) is brought over the catch piece ($i$) and forces it back, and detaches it from the arm ($f'$) on the shaft; at the same time the catch in the opposite pulley is liberated, by the arm which held it down being removed and springs out, and couples with the other arm ($f'$); at this instant the engine commences the return stroke, which, when completed causes the same operation to be performed; and so on alternately connecting and disengaging the pulleys on the shaft, which is kept in a continuous rotary motion.

What I claim as my invention and desire to secure by Letters Patent, is—

1. The combination of apparatus for engaging the pulleys with, and disengaging them from the shaft; that is to say, the rings ($g$) catches ($i$ or $l$) and arms ($f'$) constructed and arranged in the manner and for the purpose, herein set forth.

2. I also claim in combination with the above the projections ($e'$) on the pulleys ($e$) in the manner and for the purpose above described.

PETER YATES.

Witnesses:
 CHAS. P. CONE,
 ALFRED H. COLLING.